(12) United States Patent
Nakagawa

(10) Patent No.: US 8,464,770 B2
(45) Date of Patent: Jun. 18, 2013

(54) PNEUMATIC TIRE FOR MOTORCYCLE

(75) Inventor: Hidemitsu Nakagawa, Saitama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/043,588

(22) Filed: Mar. 9, 2011

(65) Prior Publication Data
US 2011/0155292 A1 Jun. 30, 2011

Related U.S. Application Data

(63) Continuation of application No. 12/663,443, filed as application No. PCT/JP2008/057621 on Apr. 18, 2008, now abandoned.

(30) Foreign Application Priority Data

Jun. 7, 2007 (JP) ................................. 2007-151973

(51) Int. Cl.
*B60C 1/00* (2006.01)
*B60C 11/00* (2006.01)

(52) U.S. Cl.
USPC .................................. 152/209.5; 152/209.11

(58) Field of Classification Search
USPC ......................................... 152/209.5, 209.11
See application file for complete search history.

(56) References Cited

U.S. PATENT DOCUMENTS

| | | | |
|---|---|---|---|
| 4,398,582 A * | 8/1983 | Yuto et al. ................... | 152/209.5 |
| 5,373,886 A * | 12/1994 | Yamaguchi et al. .......... | 152/526 |
| 6,619,355 B1 * | 9/2003 | Niizato ......................... | 152/524 |
| 7,942,178 B2 * | 5/2011 | Nakagawa ................. | 152/209.5 |
| 8,011,403 B2 * | 9/2011 | Nakagawa ................. | 152/209.5 |
| 2003/0000616 A1 | 1/2003 | Watkins et al. | |
| 2006/0102266 A1 * | 5/2006 | Ravasio et al. ............. | 152/209.5 |
| 2006/0207701 A1 | 9/2006 | Tanaka | |
| 2007/0137747 A1 | 6/2007 | Yoshida | |

FOREIGN PATENT DOCUMENTS

| | | | |
|---|---|---|---|
| JP | 07-195906 A | * | 8/1995 |
| JP | 07/195906 A | | 8/1995 |
| JP | 10-119513 A | | 5/1998 |
| JP | 10-119513 A | * | 5/1998 |

(Continued)

OTHER PUBLICATIONS

Machine translation for Japan 2000-158910.*

(Continued)

*Primary Examiner* — Steven D Maki
(74) *Attorney, Agent, or Firm* — Sughrue Mion, PLLC

(57) ABSTRACT

The tread portion 2 is divided in the tire widthwise direction into five regions comprising the center tread region A, respective shoulder tread regions C, and respective intermediate tread regions B. A curved length in the tire widthwise direction of a tread surface of the center tread region A is in the range of 10 to 35% of the curved length in the tire widthwise direction of the entire tread surface, and the whole curved length in the tire widthwise direction of a tread surface of the shoulder tread regions C is in the range of 5 to 35% of the curved length in the tire widthwise direction of the entire tread surface. 100% Mod, i.e. the modulus at 100% elongation, of tread rubber forming the intermediate tread region B is larger than 100% Mod of tread rubber forming the center tread region A, and loss tangent of each shoulder tread region C is larger than loss tangent of the center tread region A.

4 Claims, 1 Drawing Sheet

FOREIGN PATENT DOCUMENTS

| | | | |
|---|---|---|---|
| JP | 2000-158910 A | | 6/2000 |
| JP | 2000-158910 A | * | 6/2000 |
| JP | 2004-351956 A | | 12/2004 |
| JP | 2005/022622 A | | 1/2005 |
| JP | 2006-256385 A | | 9/2006 |
| JP | 2006-273240 A | | 10/2006 |

OTHER PUBLICATIONS

Machine translation for Japan 10-119513.*
Machine translation for Japan 07-195906.*
Japanese Industrial Standard JIS K 6301 (1995).*
Translation for Japan 2000-158910.*
International Search Report for International Application No. PCT/JP2008/057621, dated Jul. 22, 2008.
Extended European Search Report (EESR) issued by European Patent Office dated May 26, 2011 for corresponding European Patent Application No. 08740668.2.
Chinese Office Action dated Feb. 13, 2012, issued in corresponding Chinese Patent Application No. 200880024945.

* cited by examiner

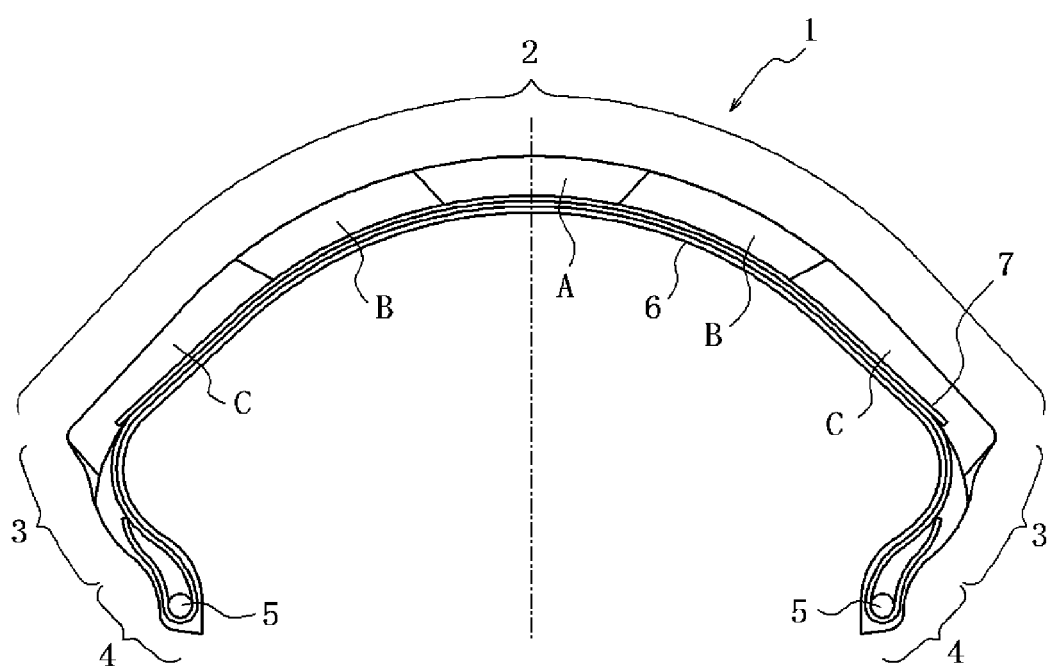

PNEUMATIC TIRE FOR MOTORCYCLE

CROSS-REFERENCE TO RELATED APPLICATIONS

This is a Continuation Application of application Ser. No. 12/663,443, filed Dec. 7, 2009, now abandoned which was the National Stage of International Application No. PCT/JP2008/057621, filed Apr. 18, 2008, and which claims the benefit under 35 U.S.C. §119 from Japanese Patent Application No. 2007-151973, filed Jun. 7, 2007, in the Japanese Patent Office, the entire contents of which are incorporated herein by reference.

TECHNICAL FIELD

The present invention relates to a pneumatic tire for motorcycle, which tire enables stable running.

PRIOR ART

In a pneumatic tire for motorcycle in general, the center portion of a tire tread is primarily in contact with a road surface in straight running of a motorcycle because the vehicle body of the motorcycle then stands substantially upright with respect to the road surface, while a shoulder portion of the tire tread is primarily in contact with a road surface in a cornering situation because the vehicle body is inclined with respect to the road surface in that situation. As a result, in a tire to be mounted to a motorcycle, the vicinity of the center portion of a tire tread, which is brought into contact with the ground in straight running, needs to have adequate rigidity which can resist driving force in the longitudinal direction and the vicinity of a shoulder portion of the tire tread, which is brought into contact with the ground in a cornering situation, needs to reliably exhibit good gripping force which can resist lateral force.

Conventionally, there has been proposed, as a pneumatic tire for motorcycle where the performance necessitated in straight running and the performance necessitated in a cornering situation are made compatible with each other, a tire using two types of tread rubber for a tread divided into three sections in the tire widthwise direction as disclosed, for example, in JP 2006 273240.

DISCLOSURE OF THE INVENTION

Problems to be Solved by the Invention

As described above, in a tire to be mounted to a motorcycle, the vicinity of the center portion of a tread of the tire needs to have adequate rigidity which can resist driving force in the longitudinal direction and the vicinity of a shoulder portion of the tread needs to reliably exhibit good gripping force which can resist lateral force. In order to enable more stable running, however, the intermediate portion between the center portion and each shoulder portion of the tread of the tire needs to exhibit good rigidity and gripping force in a compatible manner because significant lateral force, as well as driving force in the longitudinal direction, is exerted on the intermediate portion in an accelerating situation to get out of a corner or the like.

The present invention has been contrived in view of the problem described above and an object thereof is to provide a pneumatic tire for motorcycle, which tire enables stable running in any of running straight, a cornering situation and an accelerating situation to get out of a corner.

Means for Solving the Problem

The present invention provides a pneumatic tire for motorcycle, including a pair of bead portions each having a bead core embedded therein, a pair of sidewall portions extending from the bead portions toward the outer side in the tire radial direction, and a tread portion extending over the respective sidewall portions, characterized in that: the tread portion is divided in the tire widthwise direction into five regions comprising the center tread region including the tire equatorial plane, respective shoulder tread regions each including a tread ground contact end, and respective intermediate tread regions each interposed by the center tread region and the corresponding shoulder tread region; 100% Mod of tread rubber forming the intermediate tread region is larger than 100% Mod of tread rubber forming the center tread region; and loss tangent of each shoulder tread region is larger than loss tangent of the center tread region.

It is preferable that 100% Mod of the tread rubber forming the intermediate tread region is in the range of 1.3 to 2.1 MPa, loss tangent of each shoulder tread region is in the range of 0.3 to 0.4, a curved length in the tire widthwise direction of a tread surface of the center tread region is in the range of 10 to 35% of the curved length in the tire widthwise direction of the entire tread surface, and the whole curved length in the tire widthwise direction of a tread surface of the shoulder tread regions is in the range of 5 to 35% of the curved length in the tire widthwise direction of the entire tread surface. Further, it is preferable that the sidewall portion includes an indication that the tire is for use as a rear tire of a motorcycle.

Effect of the Invention

The pneumatic tire for motorcycle, of the present invention, enables stable running in any of straight running, a cornering situation and an accelerating situation to get out of a corner by using three types of tread rubber for a tread divided into five sections in the tire widthwise direction.

BRIEF DESCRIPTION OF THE DRAWINGS

FIG. 1 is a sectional view in the widthwise direction of a pneumatic tire for motorcycle, showing an embodiment of the present invention.

| Explanation of Reference Numerals | |
|---|---|
| 1 | Tire |
| 2 | Tread portion |
| 3 | Sidewall portion |
| 4 | Bead portion |
| 5 | Bead core |
| 6 | Carcass |
| 7 | Belt |
| A | Center tread region |
| B | Intermediate tread region |
| C | Shoulder tread region |

BEST MODE FOR IMPLEMENTING THE INVENTION

An embodiment of the present invention will be described with reference to drawings. FIG. 1 is a sectional view in the tire widthwise direction of a pneumatic tire for motorcycle of the present invention. A pneumatic tire 1 for motorcycle shown in FIG. 1 has a pair of bead portions 4 each having a bead core 5 embedded therein, a pair of sidewall portions 3 extending from the bead portions 4 toward the outer side in the tire radial direction, and a tread portion 2 extending over the respective sidewall portions. The tire further has a carcass 6 constituted of a carcass ply extending in a toroidal shape between the bead cores 5 embedded in the respective bead portions 4 and including side portions each being turned up around the corresponding bead core 5 toward the outer side in the tire radial direction, and a belt 7 provided outer side in the radial direction of the carcass 6.

The tread portion 2 is divided in the tire widthwise direction into five regions comprising the center tread region A including the tire equatorial plane, respective shoulder tread regions C each including a tread ground contact end, and respective intermediate tread regions B each interposed by the center tread region A and the corresponding shoulder tread region C. Three types of tread rubber is used for the tread portion 2. 100% Mod, i.e. modulus at the time of 100% elongation, of tread rubber forming the intermediate tread region B is larger than 100% Mod of tread rubber forming the center tread region A, and loss tangent of each shoulder tread region C is larger than loss tangent of the center tread region A.

In a tire for motorcycle, a ground contacting region in the tread portion in running straight differs from a ground contacting region in the tread portion in a cornering situation, as described above. Specifically, in a tire for use in motorcycle, the center tread region A, which is brought into contact with the ground in straight running, needs to have adequate rigidity which can resist driving force in the longitudinal direction, each shoulder tread region C, which is brought into contact with the ground in a cornering situation, needs to exhibit good gripping force to reliably resist lateral force exerted on the shoulder tread region due to centrifugal force, and the respective intermediate tread regions B located between the center tread region and the respective shoulder tread regions need to have higher rigidity than the center tread region and the respective shoulder tread region because significant lateral force, as well as driving force in the longitudinal direction, is exerted on the intermediate tread portion in an accelerating situation to get out of a corner or the like.

Accordingly, to enable stable running of a tire for use in motorcycle, the tread portion 2 preferably has a configuration in which the tread portion is divided into five sections as described above and the center tread region A, the intermediate tread regions B and the shoulder tread regions C have different physical properties of rubber, respectively. Further, 100% Mod of the tread rubber is preferably set to satisfy the relationship below because relatively large load is exerted on the intermediate tread regions B.

Mod(Intermediate tread region *B*)>Mod(Center tread region *A*)

Further, 100% Mod of the tread rubber forming the intermediate tread regions B is preferably in the range of 1.3 to 2.1 MPa.

Yet further, loss tangent tan δ of the tread rubber is preferably set to satisfy the relationship below because the shoulder tread regions C need to reliably exhibit relatively high gripping force.

tan δ(Shoulder tread region *C*)>tan δ(Center tread region *A*)

Further, loss tangent tan δ of the shoulder tread regions C is preferably in the range of 0.3 to 0.4.

A curved length in the tire widthwise direction of a tread surface of the center tread region A is preferably in the range of 10 to 35% of the curved length in the tire widthwise direction of the entire tread surface. In a case where the curved length of the center tread region A is less than 10% of the curved length of the entire tread surface, the rubber of the intermediate tread regions B having relatively high rigidity invades into the ground contact region used at the time of running straight, whereby rigidity of the ground contact region at the time of running straight is unnecessarily increased and riding comfort deteriorates. In a case where the curved length of the center tread region A exceeds 35% of the curved length of the entire tread surface, an effect of enhancing driving force by increasing rigidity of the intermediate tread regions B is weakened.

The whole curved length in the tire widthwise direction of a tread surface of the shoulder tread regions C is preferably in the range of 5 to 35% of the curved length in the tire widthwise direction of the entire tread surface. In a case where the whole curved length of the shoulder tread regions C is less than 5% of the curved length of the entire tread surface, an effect of enhancing gripping force by increasing tan δ of the shoulder tread regions C is weakened. In a case where the whole curved length of the shoulder tread regions C exceeds 35% of the curved length of the entire tread surface, an effect of enhancing driving force by increasing rigidity of the intermediate tread region B is weakened.

In the case of a motorcycle, an especially good effect can be obtained by applying the present invention to a tire for use as a rear tire because the rear wheel functions as a driving wheel in a motorcycle. Accordingly, it is preferable that the sidewall portion 3 shown in FIG. 3 includes an indication that the tire is for use as a rear tire of a motorcycle.

The present invention will be described with reference to Examples hereinafter. There were prepared pneumatic test tires of Examples and Comparative Examples each having tire size of 190/50ZR17 and the structure as shown in FIG. 1 according to the details shown in Table 1. Driving force, turning force (gripping force) and properties of absorbing impact from an irregular road surface were analyzed for each of the test tires. The results of the analysis are shown in Table 1. Examples 1 to 3 each employed a ply made of nylon for the carcass 6 and steel MSB (mono-spiral belt) for the belt 7 of the tire.

Each of the test tires was mounted to the rear wheel of a motorcycle (1000 cc, tire size of the front wheel: 120/70ZR17) and run on a flat track, and driving force, turning force, impact absorbing property of the tire were evaluated by sensory evaluation conducted by a driver with the score 100 of the conventional tire (the tread was not divided into sections) as the reference. The larger score represents the better performance.

TABLE 1

| | Center tread portion Mod | Intermediate tread portion Mod | Center tread portion tan δ | Shoulder tread portion tan δ | Center tread portion divisional width (%) | Shoulder tread portion divisional width (%) | Driving force | Turning force | Impact absorbing property |
|---|---|---|---|---|---|---|---|---|---|
| Conventional tire (no division) | 1.38 | 1.38 | 0.32 | 0.32 | 100 | | 100 | 100 | 100 |
| Example 1 | 1.38 | 1.68 | 0.32 | 0.34 | 22 | 22 | 120 | 125 | 105 |
| Example 2 | 1.38 | 1.68 | 0.32 | 0.34 | 22 | 18 | 125 | 120 | 100 |

TABLE 1-continued

|  | Center tread portion Mod | Intermediate tread portion Mod | Center tread portion tan δ | Shoulder tread portion tan δ | Center tread portion divisional width (%) | Shoulder tread portion divisional width (%) | Driving force | Turning force | Impact absorbing property |
|---|---|---|---|---|---|---|---|---|---|
| Example 3 | 1.38 | 1.68 | 0.32 | 0.37 | 22 | 22 | 120 | 130 | 100 |
| Example 4 | 1.38 | 1.68 | 0.32 | 0.34 | 5 | 22 | 110 | 120 | 100 |
| Example 5 | 1.38 | 1.68 | 0.32 | 0.34 | 50 | 22 | 95 | 120 | 100 |
| Example 6 | 1.38 | 1.68 | 0.32 | 0.34 | 22 | 3 | 120 | 105 | 90 |
| Example 7 | 1.38 | 1.68 | 0.32 | 0.34 | 22 | 50 | 102 | 130 | 105 |
| Comp. Example 1 | 1.68 | 1.38 | 0.32 | 0.34 | 22 | 22 | 90 | 105 | 85 |
| Comp. Example 2 | 1.38 | 1.68 | 0.32 | 0.28 | 22 | 22 | 115 | 90 | 100 |

As shown in Table 1, it can be confirmed that all of Example 1-3 tires exhibit larger driving force and turning force, respectively, as compared with the conventional tire.

Further, Example 4 tire has a curved length in the tire widthwise direction of a tread surface of the center tread region A, which is less than 10% of the curved length in the tire widthwise direction of the entire tread surface. It is confirmed that Example 4 tire exhibits smaller driving force than those of Example 1-3 tires, although driving force thereof is larger than that of Conventional tire, because the rubber of the intermediate tread portion B having relatively high rigidity invades into the ground contacting region used at the time of running straight and increases rigidity of the ground contacting region used at the time of running straight more than necessary. Example 5 tire has a curved length in the tire widthwise direction of a tread surface of the center tread region A, which exceeds 35% of the curved length in the tire widthwise direction of the entire tread surface. It is confirmed that Example 5 tire exhibits lower driving force than Conventional tire and Example 1-3 tires because an effect of enhancing driving force by increasing rigidity of the intermediate tread region B is weakened.

Further, Example 6 tire has the whole curved length in the tire widthwise direction of a tread surface of the shoulder tread regions C, which is less than 5% of the curved length in the tire widthwise direction of the entire tread surface. It is confirmed that Example 6 tire exhibits lower turning force than Example 1-3 tires, although the turning force is larger than that of Conventional tire, because an effect of enhancing gripping force by increasing tan δ of the shoulder tread regions C is weakened. Example 7 tire has the whole curved length in the tire widthwise direction of a tread surface of the shoulder tread regions C, which exceeds 35% of the curved length in the tire widthwise direction of the entire tread surface. It is confirmed that Example 7 tire exhibits lower driving force than Example 1-3 tires, although the driving force is larger than that of Conventional tire, because an effect of enhancing driving force by increasing rigidity of the intermediate tread regions B is weakened.

Comparative Example 1 tire represents a case where 100% Mod of the tread rubber forming the intermediate tread regions B is smaller than 100% Mod of the tread rubber forming the center tread regions A. It is confirmed that Comparative Example 1 tire exhibits driving force lower than that of Conventional tire because the intermediate tread regions B thereof have relatively low rigidity. Comparative Example 2 tire represents a case where loss tangent of the shoulder tread regions C is smaller than loss tangent of the center tread regions A. It is confirmed that Comparative Example 2 tire exhibits turning force lower than that of Conventional tire because the shoulder tread regions C thereof exhibit relatively small gripping force.

100% Mod of the tread rubber of the center tread region A and 100% Mod of the tread rubber of the intermediate tread region B were measured for the samples of the respective regions according to JIS K6301 (1995). Tan δ of the tread rubber of the center tread region A and tan δ of the tread rubber of the shoulder tread region C were measured by analyzing samples cut out from the base rubbers in the respective regions by a spectrometer manufactured by Toyo Seiki Seisakusho, Ltd. at 60° C. with dynamic strain of 2%.

The invention claimed is:

1. A pneumatic motorcycle tire, including a pair of bead portions each having a bead core embedded therein, a pair of sidewall portions extending from the bead portions toward the outer side in the tire radial direction, and a tread portion extending over the respective sidewall portions, characterized in that:
    the tread portion is divided in the tire widthwise direction into five regions comprising the center tread region including the tire equatorial plane, respective shoulder tread regions each including a tread ground contact end, and respective intermediate tread regions each interposed by the center tread region and the corresponding shoulder tread region;
    100% Mod of tread rubber forming the intermediate tread region is in the range of 1.3 to 2.1 MPa and larger than 100% Mod of tread rubber forming the center tread region; and
    loss tangent of each shoulder tread region is in the range of 0.3 to 0.4 and larger than loss tangent of the center tread region;
    wherein each intermediate tread region has a higher rigidity than both the center region and each shoulder region.

2. The pneumatic motorcycle tire of claim 1, wherein a curved length in the tire widthwise direction of a tread surface of the center tread region is in the range of 10 to 35% of the curved length in the tire widthwise direction of the entire tread surface, and the whole curved length in the tire widthwise direction of a tread surface of the shoulder tread regions is in the range of 5 to 35% of the curved length in the tire widthwise direction of the entire tread surface.

3. The pneumatic motorcycle tire of claim 1, wherein the sidewall portion includes an indication that the tire is for use as a rear tire of a motorcycle.

4. The pneumatic motorcycle tire of claim 2, wherein the sidewall portion includes an indication that the tire is for use as a rear tire of a motorcycle.

* * * * *